(12) United States Patent
Apokatanidis (10) Patent No.: US 10,726,733 B2
(45) Date of Patent: Jul. 28, 2020

(54) AUTOMATED TEST GENERATOR AND EVALUATOR

(71) Applicant: INTERNATIONAL BUSINESS MACHINES CORPORATION, Armonk, NY (US)

(72) Inventor: Dimitri Apokatanidis, Saint-Lambert (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/443,992

(22) Filed: Jun. 18, 2019

(65) Prior Publication Data
US 2019/0304320 A1   Oct. 3, 2019

Related U.S. Application Data

(63) Continuation of application No. 15/401,201, filed on Jan. 9, 2017, now Pat. No. 10,535,277.

(51) Int. Cl.
 G09B 7/02    (2006.01)
 G06F 40/56   (2020.01)
 G06F 40/289  (2020.01)

(52) U.S. Cl.
 CPC ............ G09B 7/02 (2013.01); G06F 40/289 (2020.01); G06F 40/56 (2020.01)

(58) Field of Classification Search
 CPC ....................................................... G09B 7/02
 USPC ........................................................ 434/350
 See application file for complete search history.

(56) References Cited

U.S. PATENT DOCUMENTS

| | | | |
|---|---|---|---|
| 5,947,747 A | 9/1999 | Walker et al. |
| 8,472,861 B2 | 6/2013 | Andreyev et al. |
| 8,632,344 B2 | 1/2014 | Attali |
| 10,198,428 B2 | 2/2019 | Bryant |
| 2002/0184265 A1 | 12/2002 | Gupta |
| 2003/0177203 A1 | 9/2003 | Crook |
| 2009/0226872 A1 | 9/2009 | Gunther |
| 2014/0315180 A1 | 10/2014 | Bruce et al. |
| 2016/0035237 A1 | 2/2016 | Nealon et al. |

OTHER PUBLICATIONS

Peter Mell et al, The NIST Definition of Cloud Computing, National Institute of Standards and Technology, Publication 800-145, 2011.
Reshma. V.M. et al, Longest Common Subsequence: A Method for Automatic Evaluation of Handwritten Essays, IOSR Journal of Computer Engineering, Nov.-Dec. 2015.
U.S. Appl. No. 15/401,201, filed Jan. 9, 2017, Confirmation No. 1522.

*Primary Examiner* — Kesha Frisby
(74) *Attorney, Agent, or Firm* — Patrick J. Daugherty; Daugherty & Del Zoppo Co., LP (57) ABSTRACT

Automated essay test generation and assessment processor device aspects identify phrases of discrete words appearing in a text data representation of a reference corpus of a subject matter as key concepts of the subject matter as a function of repetition of the first phrase within the reference corpus and an association with an organizational indicator of the reference corpus. Aspect processor devices further identify a text item that comprises a discrete objective value and that appears in association with the key concept as a question fact that is linked to the key concept, and generate an essay question comprising an instruction to compose an essay answer that associates the key concept to a generic domain attribute of the linked question fact.

20 Claims, 5 Drawing Sheets

AUTOMATED TEST GENERATOR AND EVALUATOR

BACKGROUND

Essay questions are generally used to assess complex, college-level coursework, particularly at the graduate school level. To demonstrate understanding of complex course material in response to an essay question, a student is generally expected to write a long answer, in a natural language grammar syntax, that conveys thoughts, real-world examples and defines complex solutions to test cases or scenarios. Essay questions are a superior method of evaluating a person's understanding of a course with multiple complex topics, relative to multiple choice and fill-in-the-blank testing techniques.

Essay examinations provide means for establishing whether students have mastered essential concepts within coursework. In drafting an answer to an essay question a student is generally expected to demonstrate understanding of complicated topics in essay form. However, long answer, essay-type questions do not generally have a single correct answer. As such, individual answers to the same question can vary greatly, while still satisfying the requirements of said question.

A correct, or relatively better answer, expresses an understanding of the essential concepts of a coursework corpus knowledge within the response text, rather than simply providing an expected answer. It is difficult to define a uniform and consistent, objective grading scheme for essay questions, one that is not impacted by divergent student performances with respect to individualized grammar usage and structures, or spelling errata. Graders must define standards for point deductions or increases that are reliably replicable and consistent across a wide variety of student performances. When teams of graders, or different assessment devices, are used to correct an exam, grades tend to vary for given answer over different graders or assessment devices.

BRIEF SUMMARY

In one aspect of the present invention, a computerized method for automated essay test generation and assessment includes executing steps on a computer processor. Thus, a computer processor identifies a first ordered phrase of discrete words appearing in a text data representation of a reference corpus of a subject matter as a key concept of the subject matter as a function of repetition of the first phrase within the reference corpus and an association with an organizational indicator of the reference corpus. The processor further identifies a text item that comprises a discrete objective value and that appears in association with the key concept as a question fact that is linked to the key concept, and generates an essay question comprising an instruction to compose an essay answer that associates the key concept to a generic domain attribute of the linked question fact.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies a first ordered phrase of discrete words appearing in a text data representation of a reference corpus of a subject matter as a key concept of the subject matter as a function of repetition of the first phrase within the reference corpus and an association with an organizational indicator of the reference corpus. The processor further identifies a text item that comprises a discrete objective value and that appears in association with the key concept as a question fact that is linked to the key concept, and generates an essay question comprising an instruction to compose an essay answer that associates the key concept to a generic domain attribute of the linked question fact.

In another aspect, a computer program product for automated essay test generation and assessment has a computer-readable storage medium with computer readable program code embodied therewith. The computer readable hardware medium is not a transitory signal per se. The computer readable program code includes instructions for execution which cause the processor to identify a first ordered phrase of discrete words appearing in a text data representation of a reference corpus of a subject matter as a key concept of the subject matter as a function of repetition of the first phrase within the reference corpus and an association with an organizational indicator of the reference corpus. The processor is further caused to identify a text item that comprises a discrete objective value and that appears in association with the key concept as a question fact that is linked to the key concept, and generates an essay question comprising an instruction to compose an essay answer that associates the key concept to a generic domain attribute of the linked question fact.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
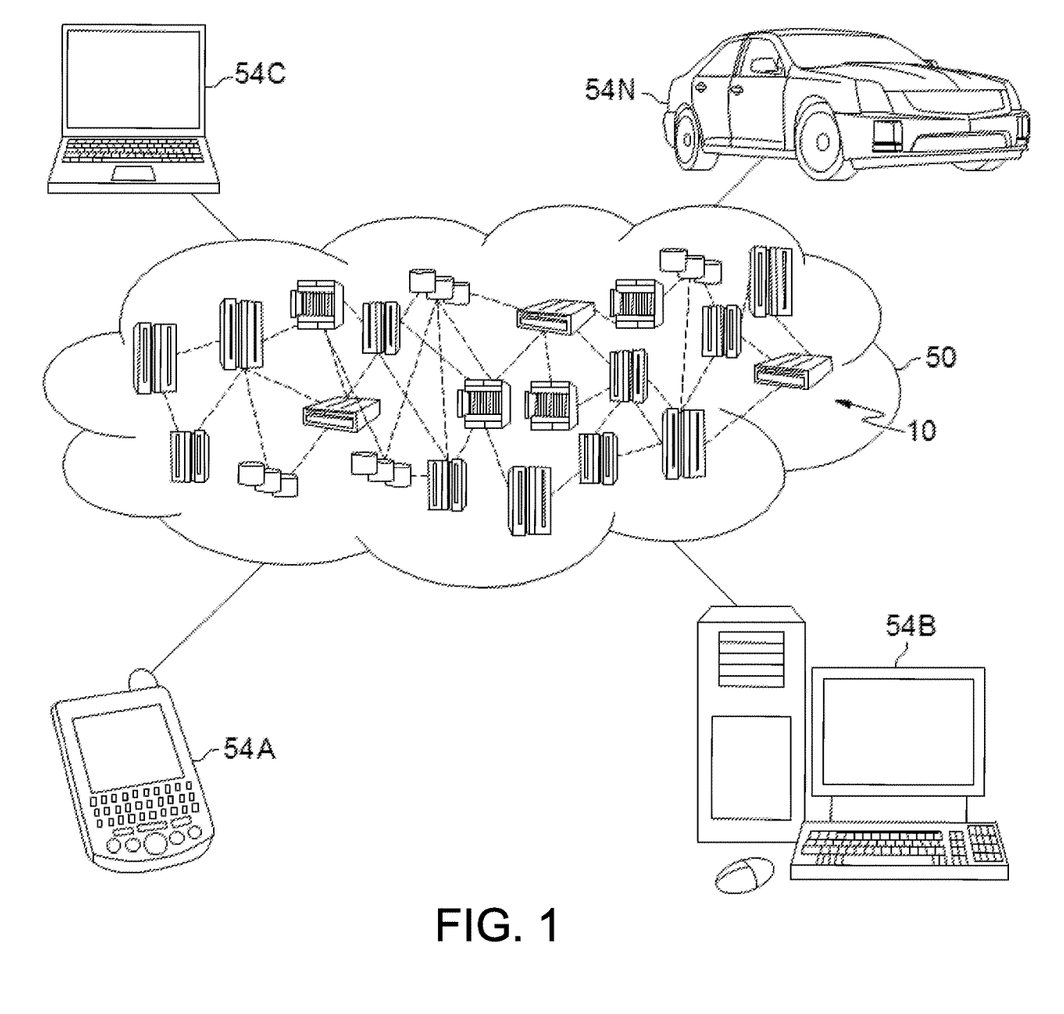
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
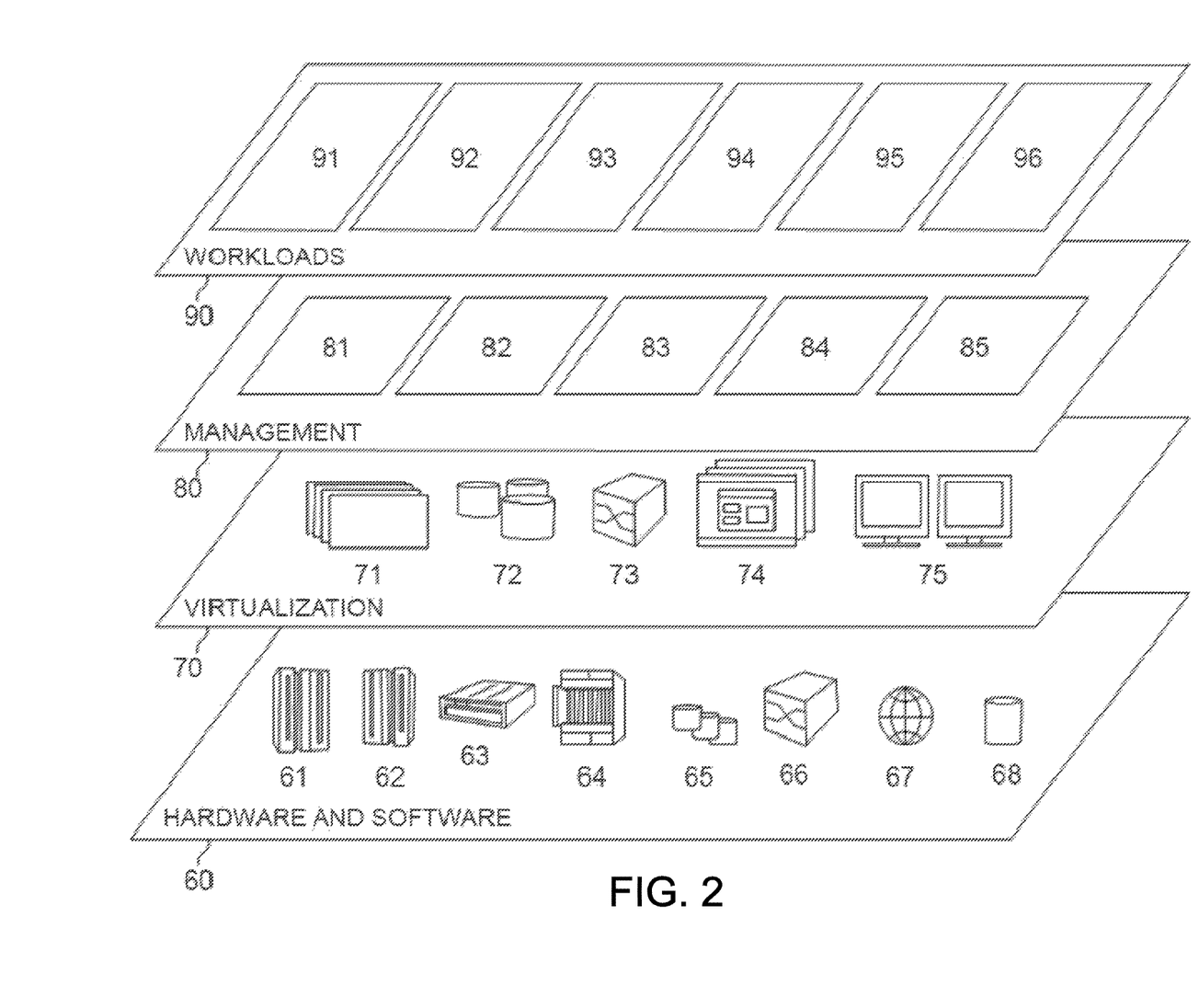
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for automated essay test generation and assessment 96.

Figure 3:
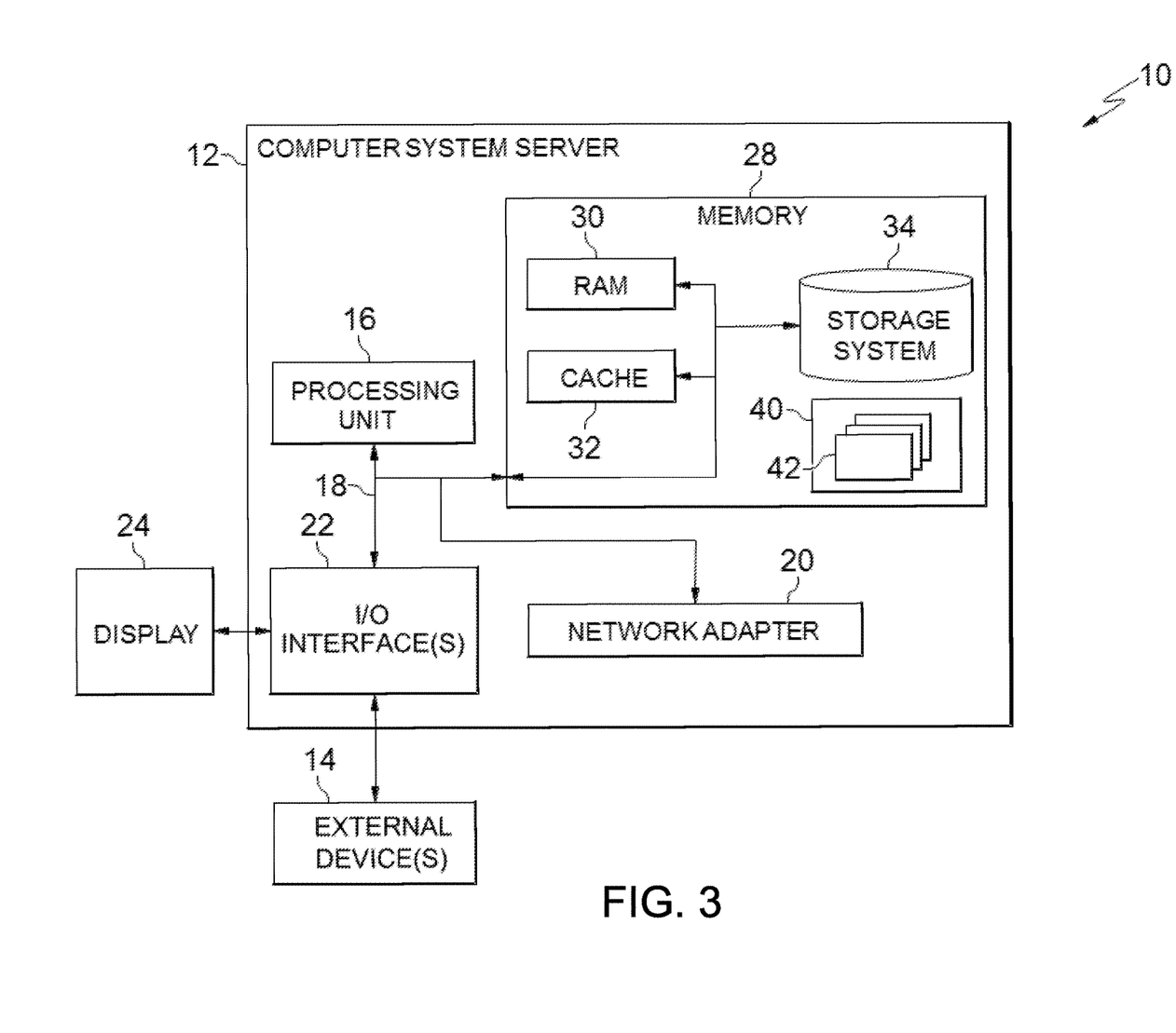
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Automated test generation and assessment process and devices are useful for administering and assessing multiple choice and fill-in-the-blank tests. Programmable devices may readily determine whether a student has learned individual key concepts that are limited to phrases, sentences or paragraphs formed from the same; or to only one, correct answer, such as value generated by the correct application of mathematics to solve a problem statement. Thus, automated testing devices and procedures may recognize and distinguish basic correct answers from incorrect answers, for example paragraph choice "A" versus choice "B", or a correct numeric value determination versus an incorrect value.

However, deploying automated techniques to accurately assess the performance of a student on an essay exam is generally no more efficient under prior art techniques with respect to time and resource costs than using conventional human graders. A correct, or relatively better, answer expresses an understanding of essential concepts of a coursework corpus knowledge within the response text. It is difficult to define an objective grading scheme for essay questions that may be uniformly and consistently applied via automated processes. Evaluating the quality of an essay answer generally requires application of complex, high-level and selective processing, wherein automated outputs must be reviewed for accuracy and obvious mistakes by human monitors, rendering the task generally inefficient to assign to automated processes under the prior art.

Figure 4:
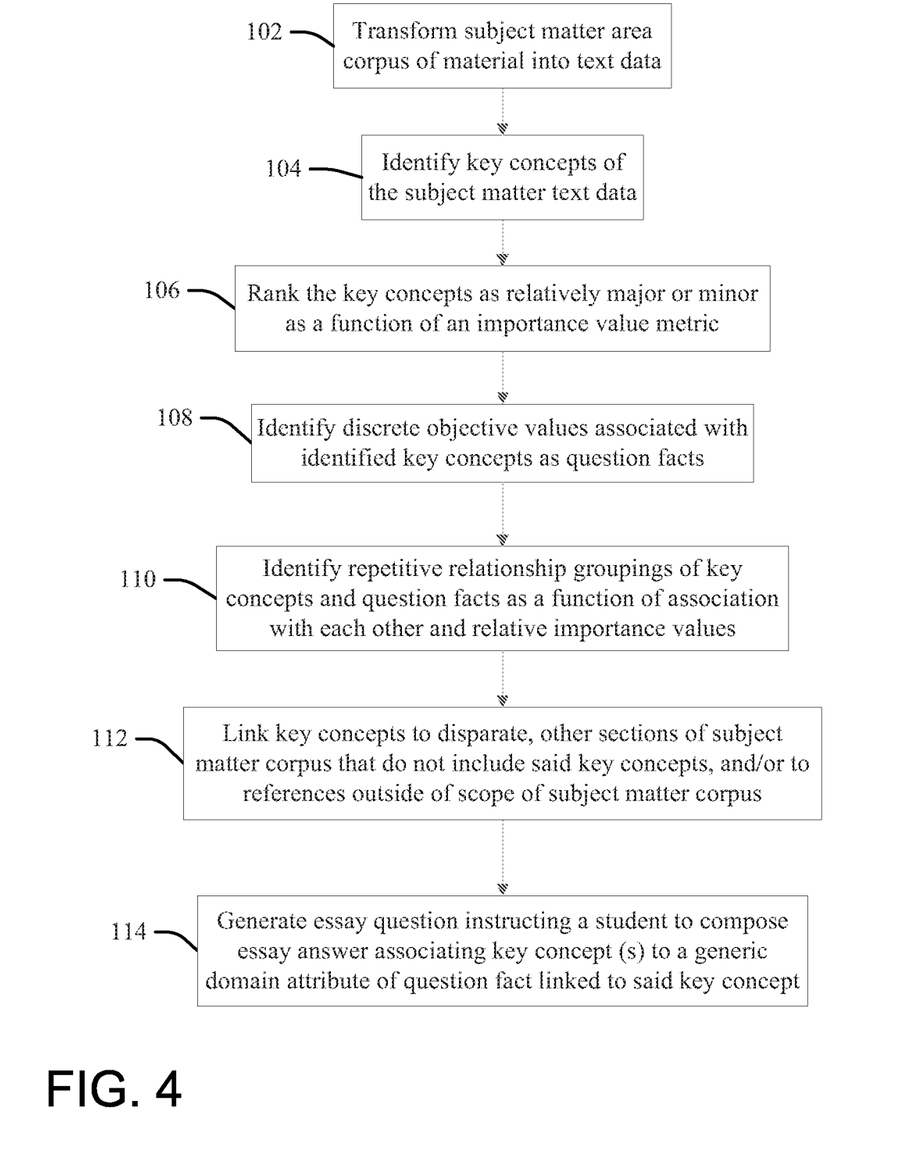
FIG. 4 is a flow chart illustration of an embodiment of the present invention.

FIG. 4 illustrates a process or system according to the present invention for automated essay test generation and assessment. At 102 a processor that is configured according to an aspect of the present invention (the "configured processor") transforms a corpus of material for a subject matter area into text data that is stored on or otherwise accessible on a digital storage device. The configured processor may be implemented in accordance with the computer system server 10 of FIG. 3, including as the cloud node 10 of FIG. 1, as described respectively above.

Transforming the subject material into text at 102 comprehends uploading image data that comprises text material and processing the image data to identify the subject matter text data, and thus the recognition, accumulation and assimilation of a wide variety of material into a digital form amenable to content processing. For example, the step or process 102 may include scanning a printed course book, study guide, prior year's test, etc., into visual data and processing the scanned visual data into text data via optical character recognition (OCR); uploading video or audio data of lectures and presentations; transforming spoken content within into text data via speech-to-text processing; uploading text data published on websites; downloading file copies of scholarly treatises, white papers, etc.; and still other examples will be apparent to one skilled in the art.

At 104 the configured processor identifies key concepts of the subject matter from the uploaded a corpus of material. Identifying the key concept phrases (discrete ordered grouping of different words) includes performing natural language processing to parse the content of the text data uploaded or generated from the subject matter and using artificial intelligence processes to identify and distinguish ordered groupings of different words that are repeated within the reference corpus and associated with organizational indicators of the reference corpus that indicate a likelihood that the text data defines an important or "key" topic of the generic subject matter of an uploaded work.

Key concept phrases may be identified at 104 as phrases repeated within the text data and distinguished as a function of location or prominence within the text data and/or by emphasis indicators. For example, as repeated phrases that appear with a threshold frequency within a subject area subsection, such as three times or more in a chapter, regardless of positioning within the body of text (though other threshold value may be chosen and applied), or based on location or prominence within the text sections (for example, in response to determining that they are introduced in an abstract, initial, concluding or summary paragraphs of a section, and also repeated in other paragraphs of the same section).

Key concepts may be identified from occurrences within organizational headings. Illustrative but not exhaustive examples include titles, subtitles, or headings for chapters, sub-chapters, sections; abstracts, syllabus outline entries or other discrete subject area heading indicators; and further as reinforced by repetitive occurrences within bodies of the text data that are associated with said organizational subdivision headings, there distinguishing the phrases from other (non-key concept) groupings.

Illustrative but not exhaustive examples of emphasis indicators are bullet points, font emphasis (boldface, italic, underscore, color differential, etc.) relative to other text. By looking at combinations of the physical structure and formatting (which parts of the material the keyword phrases appear), aspects of the present invention use existing natural language processing and deep learning algorithms to establish relationships in data at a complex level.

At 106 the configured processor ranks the key concepts as relatively major or minor with respect to others of the key concepts, generally as a function of an importance value metric. For example, key concepts that occur more frequently within a section of the text data are given higher importance values; or those that appear in both an initial paragraph of a section and a concluding paragraph are given higher importance values relative to key concepts that appear in only one of said initial or conclusory paragraphs, or that appear in different paragraphs. Importance values may be set via relative proximity to text phrases indicative of importance: for example, key concepts within a same sentence and following the phrase "important issue," "key concept," "critical step," etc., may be assigned higher importance values.

At 108 the configured processor identifies question facts (discrete objective values) that are distinguished from the key concept phrasing but appear within the corpus subject matter text data in association with identified key concepts, and thus are appropriate for combination therewith in order to create essay questions. Illustrative but not limiting or exhaustive examples of facts include dates, number values, names, geographic locations, monetary valuations, dimensions, weights, material compositions, and still others will be apparent to one skilled in the art. The association may be a direct relationship (occurring within a same sentence and linked by a linking verb or adverb), or an indirect association (for example, within a same paragraph, or within a threshold number of words of a key concept).

At 110 the configured processor identifies relationship groupings of the key concepts and question facts as a function of their association with each other, their relative importance values, and their proximity to the identified facts. For example, grouping concepts that appear repetitively with each other (proximate to each other within a threshold number of words, or occurring within same sentences, paragraphs, sub-sections, etc.) are concept groups or clusters, or labelled as related concepts.

In some aspects the configured processor re-ranks the relative importance values of the key concepts at 110 as a function of their association with the other concepts: for example, reducing the importance value of a first key concept relative to a second key concept in response to determining that said first key concept occurs less frequently within same paragraphs as a more highly important third key concept than does the second key concept; or that the second key concept appears in both introductory and conclusory paragraphs of a section with the highly-important third key concept, but the first key concept does not.

At 112 the configured processor links key concepts to disparate, other sections of the subject matter corpus that do not include said key concepts, and/or to references outside of the scope of the subject matter corpus, as a function of their relationships to the identified facts, and to other ones of the key concepts as determined at 110. For example, in response to identifying a subject of identified key concept "A" is "world war one;" a subject of another identified key concept "B" that is grouped with related key concept "A" is the "Battle of Verdun," and that both are related to a fact "C" of a number of "wounded," the configured processor may determine that the group of linked key concepts A, B and fact C define a real world example or scenario that should be recognized by students of the material. The configured processor may also link key concepts A, B and fact C to an external database, or to another section of the subject matter corpus, that comprises other facts associated with World War One and the Battle of Verdun, such as a database of allied forces casualties by date that is thereby relevant to a grouping of concepts A, B and fact C.

At 114 the configured processor generates an essay question (a text statement in a question form) that instructs a student to compose an essay answer that associates a key concept (or each key concept in a grouping of the key concepts linked at 112) to a generic domain attribute of the question fact linked to the key concept (or group thereof) at 112. The attribute identifies a generic domain that includes the objective value of the linked question fact: for example, for a date (month/day/year) fact value, an attribute query may be "discuss allied causalities during the year value, or winter of the year value, of the "key concept A"; for fact value of a monetary amount, an attribute query may be "discuss total gross domestic product increases for the "key concept B" during the X decade."

Figure 5:
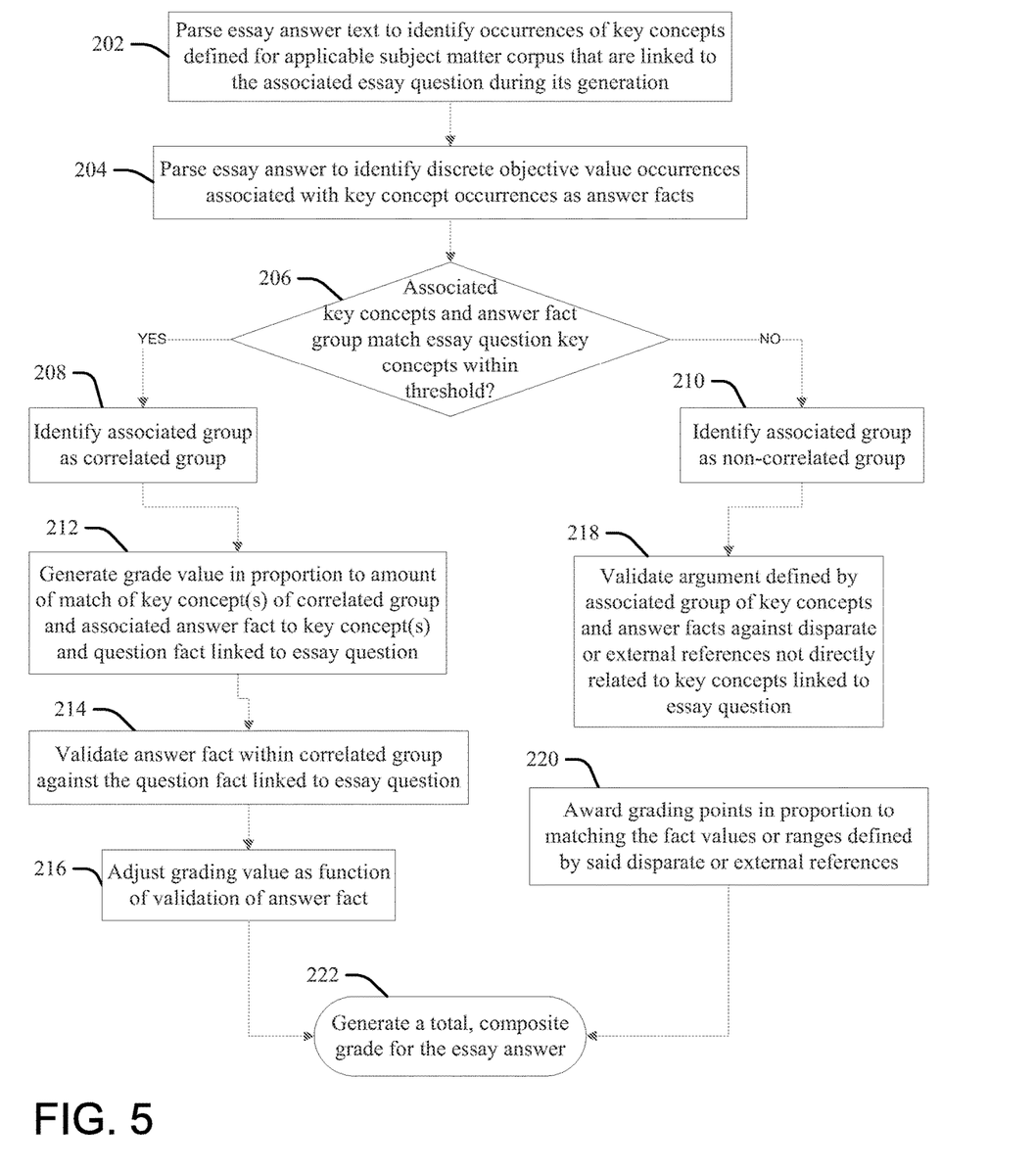
FIG. 5 is a flow chart illustration of another embodiment of the present invention.

FIG. 5 illustrates another aspect of the present invention, wherein at 202 a processor that is configured according to an aspect of the present invention (the "configured processor") parses a student's essay answer (a plurality of text words) that is associated with an essay question to identify occurrences of any key concepts defined for the applicable subject matter corpus and used to generate the question (at step or process 114, FIG. 4), which are thereby specifically linked to the essay question. The configured processor may be implemented in accordance with the computer system server 10 of FIG. 3, including as the cloud node 10 of FIG. 1, as described respectively above, and may be the same configured processor as described above with respect to FIG. 4, or it may be a different processor.

At 204 the configured processor parses the student's essay answer to identify any answer facts (discrete objective values) occurrence that are associated with the key concept occurrences identified within the answer text at 202.

At 206 the configured processor determines whether associated groups of the key concepts identified within the answer text and respective answer facts match key concepts within the essay question within a threshold value (frequency of direct match, percentage of likelihood of term matching, etc.). If so, then the groups are identified as correlated groups at 208; else, they are identified as non-correlated groups at 210.

At 212 the configured processor generates a grade value for the correlated groups in proportion to an amount (strength) of match of the correlated group key concept(s) and first answer fact to the key concept(s) and question fact used to generate the essay question. Strength of match values may be generated as a function of frequency of matching the key concepts and facts to the question key concepts and question facts, and in some aspects in proportion to match of major (higher ranked ones of the key concepts as ranked at 106, FIG. 4), for example, a numerical frequency count value, and in some examples meeting upper and lower limit constraints for valid or invalid comparisons; or via matching of data points, such as text characters or words between the answer text and the question key concepts and question facts, including as subject to meeting success threshold constraints (for example, 65% match, etc.) to received credit (grading value points). Thus, the more valid or strong the links the key concepts present in the answer to the basic concepts used to generate the question, the higher the grade value awarded to the essay answer (for at least the correlated group key concept(s) and answer facts).

At 214 the configured processor validates the answer facts within the correlated group key concept(s) against the question facts used to generate the essay question (for example, determining whether the answer fact date, monetary amount, etc. meets a correct value or falls within a valid range of values), and at 216 adjusts the grading value awarded accordingly (for example, subtracting points if the answer fact fails to meet the requisite value or value range).

Some aspects further assess and evaluate the non-correlated groups of key concepts and facts found within the essay answer, those that do not match key concepts within the essay question within the threshold values as determined applied at 206. Accordingly, at 218 the configured processor validates arguments defined by the non-correlated groups of key concepts and associated answer facts found within the essay answer against references external to portions of the corpus that are relevant to the key concepts linked to the question (other external references, or those disparate sections of the subject matter corpus established (at 112, FIG. 4) as not directly related to the key concepts forming the basis of the essay question).

At 220 the configured processor awards grading points based on (for example, in proportion to) matching the fact values or range of values defined (established, etc.) by said disparate sources. Aspects utilize relationships between the key concepts and the facts to the standards and values found in or defined by the disparate or external references to grade the non-correlated answers based on how many correct conceptual relationships occur in said answer portions. Thus, otherwise valid arguments that are insufficiently correlated to the key concepts used to define the essay question are not disregarded, but rather they are validated against the disparate, other sections links. This enables the automated device or process to award credit for valid arguments that may be off-point, but are otherwise still valid and worthy arguments indicative (in part) of the overall quality of the performance of the student on the essay exam. Thus, aspects ensure that unique or unconventional valid arguments are not improperly thrown out or disregarded in assessing the student performance.

Accordingly, at 222 the configured processor generates a total grade for the essay answer as a function of the grading values generated for the correlated groups at 216, and of the grading values generated for the non-correlated groups at 220. Thus, they may be added together, or differentially weighted, etc., to generate a final grade, and still other composite grading approaches will be appreciated by one skilled in the art.

Aspects of the present invention provide advantages over prior art approaches to introduce automated processes into the grading of essay and long-form test answers. In university level courses students are expected to demonstrate their understanding of complicated topics in essay form. However, long answer, essay type questions do not have a single correct answer. As such, individual answers to the same question can vary greatly, while still satisfying the requirements of said question. Aspects go beyond searching for key concepts and facts in isolation, but instead automatically generate scoring values as a function of validity of discrete groupings of concepts and facts, and thereby of the ability of the student to express a correct understanding of course and related area knowledge in the response they have provided.

Aspects also eliminate the tedious tasks of creating and grading academic essay questions for examinations. There is no longer a need for professors to expend time and effort in compiling examination questions, nor the need for consortiums to regulate and monitor the publishing of examinations. Individual subjective biases are replaced with an objective, autonomous process that provides unbiased and consistent grading for all essay questions answers.

It is difficult for a single person to come up with a strict and consistent grading scheme for essay questions. What's more, a grader needs to decide if they are going to deduct points for such things as spelling and grammar, and if they do, they must penalize the same offense in the same manner all the way across the board. This can be hard enough for a single grader to maintain, and given the fact that exams are often corrected by teams, it is nearly impossible to ensure absolute consistency with such penalties. Factors such as style of handwriting and color of ink can also have an impact on how an individual grader assesses an examination. In contrast, all essay questions are treated equally, penalized consistently and deeply analyzed to ensure core understanding of all provided course material via the automated aspects of the present invention. The removal of the human factor will also prevent errors during the correction and grading phase.

Cheating due to the availably of the answers to previous examinations is eliminated. Individuals who are proficient in a particular subject matter are not necessarily the best option for creating examinations. Human beings tend to remain within their personal comfort zones. As such, an individual who creates examination questions from the same academic material on a regular basis may unintentionally venture into repetitiveness. Through the use of natural language processing, the entire contents of a course are utilized by aspects of the present invention in order to ensure creative and unique testing questions. Countless, very different examinations can now be generated from the same course material. Other methods of cheating can be easily detected during the grading phase as identical phrases or wording can be picked up by the automated processes. Ideas or structure of the answers across all of the student's exams may also be analyzed to determine if they are a little bit too similar, indicative of plagiarism.

Prior art current methods for essay question correction generally use "model answer" keys, delegating the correcting work to additional individuals, or using alternate methods such as multiple choice questions in order to save time. It is not feasible to expect professors to carefully read and perform an in-depth analysis of every single student answer, while simultaneously checking all points against all of the course material, let alone do this in a timely manner, as is achieved by the automated aspects of the present invention.

By treating course text material as processing input aspects of the present invention gaining an understanding of the content that is used to generate unique long answer essay questions to test student knowledge. Once the exams are completed by the students, the aspects consistently grade the tests as a function of finding relationships in the answers to the course material, and may incorporate other standards as needed, for example spelling, punctuation and grammar metrics.

When it comes to human correction of a large number of exams in a timely manner, prior art solutions deploy teacher assistants or groups of individuals sharing a correction load. In a university setting, the amount and frequency of exams that need to be corrected is too vast for a single professor to handle efficiently. As such, they will usually have several people assisting in correcting examinations, which may lead to inconsistency in corrections. While it is difficult or even impossible for a group of people to provide homogenous score ratings covering a large number of criteria, it is possible for a machine aspect of the present invention, one that is not influenced negatively by external stressors such as preconceptions, stress and fatigue, any of which may cause the same person to grade the same answer differently at two different points in time. Aspects of the invention also will provide a much faster turnover time for corrections, which allows students to make quicker adjustments to their course habits based on how they performed on the graded test.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    transforming an essay answer material into essay answer text content via a process selected from the group consisting of optical character recognition processing of image data of the essay answer material, and speech-to-text processing of audio data of the essay answer material;
    parsing the essay answer text content via natural language processing to identify an occurrence of a key concept within the essay answer text content;
    parsing the essay answer text content via natural language processing to identify an occurrence of a discrete objective value that is associated with the occurrence of the key concept within the essay answer text content as an associated answer fact; and generating a correlated grade value for the essay answer text content in proportion to a value of a strength of match of the identified occurrence of the key concept and the associated answer fact to a key concept of an essay question.

2. The method of claim 1, wherein the generating the correlated grade value is responsive to determining that the value of the strength of match of the identified occurrence of the key concept and the associated answer fact to the key concept of the essay question meets a threshold match value, the method further comprising:

determining the value of the strength of match of the identified occurrence of the key concept and the associated answer fact to the key concept of the essay question as a frequency of direct match or a percentage of likelihood of term matching;

in response to determining that the value of the strength of match does not meet the threshold match value, generating a non-correlated grade value for the essay answer text content as a function of validating the identified occurrence of the key concept and the associated answer fact; and generating a composite grade for the essay answer text content as a function of the non-correlated grade value, and a correlated grade value generated for an identified occurrence of another key concept and another associated answer fact within the essay answer text content.

3. The method of claim 2, further comprising:

in response to determining that the value of the strength of match does not meet the threshold match value, validating the identified occurrence of the key concept and the associated answer fact by comparing the association of the identified occurrence of the key concept and the associated answer fact to an external reference that is selected from the group consisting of:

another reference that is outside of a scope of a subject matter corpus that is associated to the essay question; and a disparate section of the subject matter corpus that is not directly related to a portion of the subject matter corpus that establishes the association of the key concept to a generic domain attribute of the linked question fact that is used to generate the essay question.

4. The method of claim 3, further comprising:

parsing reference corpus text content of the subject matter corpus via natural language processing to identify a first phrase comprising an ordered string of discrete text words appearing in the reference corpus text content;

identifying the first phrase as the key concept as a function of determining a repetition of the first phrase within the reference corpus text content and an association of the first phrase with an organizational indicator of the reference corpus;

identifying a text item within the reference corpus text content that comprises the discrete objective value and that appears within a threshold number of words of the key concept as a question fact that is linked to the key concept; and generating the essay question to comprise a plurality of text string words that define an instruction to compose the essay answer material that associates the key concept to a generic domain attribute of the question fact.

5. The method of claim 4, wherein the discrete objective value is selected from the group consisting of a date, a number value, a name, a geographic location, a monetary valuation, a physical dimension and a material composition.

6. The method of claim 4, further comprising:

determining the association of the first phrase with the organizational indicator of the reference corpus as a function that is selected from the group consisting of:

determining that the first phrase appears with a threshold frequency within a subject area subsection of the reference corpus text content;

determining that the first phrase appears within a section of the reference corpus text content that is selected from the group consisting of an abstract paragraph, an introductory paragraph, a concluding paragraph, a summary paragraph, an organizational heading, a title and an outline entry; and determining that the first phrase appears with a font emphasis within the reference corpus text content that is selected from the group consisting of a bullet point indicator and a differential font attribute.

7. The method of claim 1, further comprising:

integrating computer-readable program code into a computer system comprising a processor, a computer readable memory in circuit communication with the processor, and a computer-readable storage medium in circuit communication with the processor; and wherein the processor executes program code instructions stored on the computer-readable storage medium via the computer readable memory and thereby performs the transforming the essay answer material into the essay answer text content, the parsing the essay answer text content to identify the occurrence of the key concept within the essay answer text content, the parsing the essay answer text content to identify the occurrence of the discrete objective value associated with the occurrence of the key concept within the essay answer text content as the associated answer fact, and the generating the correlated grade value for the essay answer text content in proportion to the value of the strength of match of the identified occurrence of the key concept and the associated answer fact to the key concept of an essay question.

8. The method of claim 7, wherein the computer-readable program code is provided as a service in a cloud environment.

9. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

transforms an essay answer material into essay answer text content via a process selected from the group consisting of optical character recognition processing of image data of the essay answer material, and speech-to-text processing of audio data of the essay answer material;

parses the essay answer text content via natural language processing to identify an occurrence of a key concept within the essay answer text content;

parses the essay answer text content via natural language processing to identify an occurrence of a discrete objective value that is associated with the occurrence of the key concept within the essay answer text content as an associated answer fact; and generates a correlated grade value for the essay answer text content in proportion to a value of a strength of match of the identified occurrence of the key concept and the associated answer fact to a key concept of an essay question.

10. The system of claim 9, wherein the processor executes the program instructions stored on the computer-readable storage medium via the computer readable memory and thereby:
generates the correlated grade value in response to determining that the value of the strength of match of the identified occurrence of the key concept and the associated answer fact to the key concept of the essay question meets a threshold match value;
determines the value of the strength of match of the identified occurrence of the key concept and the associated answer fact to the key concept of the essay question as a frequency of direct match or a percentage of likelihood of term matching;
in response to determining that the value of the strength of match does not meet a threshold match value, generates a non-correlated grade value for the essay answer text content as a function of validating the identified occurrence of the key concept and the associated answer fact; and
generates a composite grade for the essay answer text content as a function of the non-correlated grade value, and a correlated grade value generated for an identified occurrence of another key concept and another associated answer fact within the essay answer text content.

11. The system of claim 10, wherein the processor executes the program instructions stored on the computer-readable storage medium via the computer readable memory and thereby:
in response to determining that the value of the strength of match does not meet the threshold match value, validates the identified occurrence of the key concept and the associated answer fact by comparing the association of the identified occurrence of the key concept and the associated answer fact to an external reference that is selected from the group consisting of:
another reference that is outside of a scope of a subject matter corpus that is associated to the essay question; and
a disparate section of the subject matter corpus that is not directly related to a portion of the subject matter corpus that establishes the association of the key concept to the generic domain attribute of the linked question fact that is used to generate the essay question.

12. The system of claim 11, wherein the processor executes the program instructions stored on the computer-readable storage medium via the computer readable memory and thereby:
parses reference corpus text content of the subject matter corpus via natural language processing to identify a first phrase comprising an ordered string of discrete text words appearing in the reference corpus text content;
identifies the first phrase as the key concept as a function of determining a repetition of the first phrase within the reference corpus text content and an association of the first phrase with an organizational indicator of the reference corpus;
identifies a text item within the reference corpus text content that comprises the discrete objective value and that appears within a threshold number of words of the key concept as a question fact that is linked to the key concept; and
generates the essay question to comprise a plurality of text string words that define an instruction to compose the essay answer material that associates the key concept to a generic domain attribute of the question fact.

13. The system of claim 12, wherein the discrete objective value is selected from the group consisting of a date, a number value, a name, a geographic location, a monetary valuation, a physical dimension and a material composition.

14. The system of claim 12, wherein the processor executes the program instructions stored on the computer-readable storage medium via the computer readable memory and thereby:
determines the association of the first phrase with the organizational indicator of the reference corpus as a function that is selected from the group consisting of:
determining that the first phrase appears with a threshold frequency within a subject area subsection of the reference corpus text content;
determining that the first phrase appears within a section of the reference corpus text content that is selected from the group consisting of an abstract paragraph, an introductory paragraph, a concluding paragraph, a summary paragraph, an organizational heading, a title and an outline entry; and
determining that the first phrase appears with a font emphasis within the reference corpus text content that is selected from the group consisting of a bullet point indicator and a differential font attribute.

15. A computer program product, comprising:
a computer readable storage medium having computer readable program code embodied therewith, wherein the computer readable storage medium is not a transitory signal per se, the computer readable program code comprising instructions for execution by a processor that cause the processor to:
transform an essay answer material into essay answer text content via a process selected from the group consisting of optical character recognition processing of image data of the essay answer material, and speech-to-text processing of audio data of the essay answer material;
parse the essay answer text content via natural language processing to identify an occurrence of a key concept within the essay answer text content;
parse the essay answer text content via natural language processing to identify an occurrence of a discrete objective value that is associated with the occurrence of the key concept within the essay answer text content as an associated answer fact; and
generate a correlated grade value for the essay answer text content in proportion to a value of a strength of match of the identified occurrence of the key concept and the associated answer fact to a key concept of an essay question.

16. The computer program product of claim 15, wherein the computer readable program code instructions for execution by the processor further cause the processor to:
generate the correlated grade value in response to determining that the value of the strength of match of the identified occurrence of the key concept and the associated answer fact to the key concept of the essay question meets a threshold match value;
determine the value of the strength of match of the identified occurrence of the key concept and the associated answer fact to the key concept of the essay question as a frequency of direct match or a percentage of likelihood of term matching;

in response to determining that the value of the strength of match does not meet a threshold match value, generate a non-correlated grade value for the essay answer text content as a function of validating the identified occurrence of the key concept and the associated answer fact; and generate a composite grade for the essay answer text content as a function of the non-correlated grade value, and a correlated grade value generated for an identified occurrence of another key concept and another associated answer fact within the essay answer text content.

17. The computer program product of claim 16, wherein the computer readable program code instructions for execution by the processor further cause the processor to:

in response to determining that the value of the strength of match does not meet the threshold match value, validate the identified occurrence of the key concept and the associated answer fact by comparing the association of the identified occurrence of the key concept and the associated answer fact to an external reference that is selected from the group consisting of:

another reference that is outside of a scope of a subject matter corpus that is associated to the essay question; and a disparate section of the subject matter corpus that is not directly related to a portion of the subject matter corpus that establishes the association of the key concept to the generic domain attribute of the linked question fact that is used to generate the essay question.

18. The computer program product of claim 17, wherein the computer readable program code instructions for execution by the processor further cause the processor to:

parse reference corpus text content of the subject matter corpus via natural language processing to identify a first phrase comprising an ordered string of discrete text words appearing in the reference corpus text content;

identify the first phrase as the key concept as a function of determining a repetition of the first phrase within the reference corpus text content and an association of the first phrase with an organizational indicator of the reference corpus;

identify a text item within the reference corpus text content that comprises the discrete objective value and that appears within a threshold number of words of the key concept as a question fact that is linked to the key concept; and generate the essay question to comprise a plurality of text string words that define an instruction to compose the essay answer material that associates the key concept to a generic domain attribute of the question fact.

19. The computer program product of claim 18, wherein the discrete objective value is selected from the group consisting of a date, a number value, a name, a geographic location, a monetary valuation, a physical dimension and a material composition.

20. The computer program product of claim 18, wherein the computer readable program code instructions for execution by the processor further cause the processor to:

determine the association of the first phrase with the organizational indicator of the reference corpus as a function that is selected from the group consisting of:

determining that the first phrase appears with a threshold frequency within a subject area subsection of the reference corpus text content;

determining that the first phrase appears within a section of the reference corpus text content that is selected from the group consisting of an abstract paragraph, an introductory paragraph, a concluding paragraph, a summary paragraph, an organizational heading, a title and an outline entry; and determining that the first phrase appears with a font emphasis within the reference corpus text content that is selected from the group consisting of a bullet point indicator and a differential font attribute.

\* \* \* \* \*